(12) United States Patent
Tan et al.

(10) Patent No.: US 12,405,891 B2
(45) Date of Patent: Sep. 2, 2025

(54) GRAPHICS PROCESSOR CACHE FOR DATA FROM MULTIPLE MEMORY SPACES

(71) Applicant: Apple Inc., Cupertino, CA (US)

(72) Inventors: Dimitri Tan, Austin, TX (US); William V. Miller, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/583,520

(22) Filed: Feb. 21, 2024

(65) Prior Publication Data

US 2025/0068564 A1  Feb. 27, 2025

Related U.S. Application Data

(60) Provisional application No. 63/578,719, filed on Aug. 25, 2023.

(51) Int. Cl.
| | |
|---|---|
| *G06F 12/08* | (2016.01) |
| *G06F 12/0811* | (2016.01) |
| *G06F 12/084* | (2016.01) |
| *G06T 1/60* | (2006.01) |

(52) U.S. Cl.
CPC ........ *G06F 12/084* (2013.01); *G06F 12/0811* (2013.01); *G06T 1/60* (2013.01)

(58) Field of Classification Search
CPC ....... G06F 12/084; G06F 12/0811; G06T 1/60
See application file for complete search history.

(56) References Cited

U.S. PATENT DOCUMENTS

| | | | |
|---|---|---|---|
| 10,127,627 B2 | 11/2018 | Seiler | |
| 11,151,034 B2 | 10/2021 | Garcia Guirado et al. | |
| 2003/0145171 A1* | 7/2003 | Fetzer | G06F 12/0897 |
| | | | 711/E12.043 |
| 2015/0120998 A1 | 4/2015 | Wang et al. | |

(Continued)

FOREIGN PATENT DOCUMENTS

| | | |
|---|---|---|
| CN | 115421899 | 12/2022 |
| CN | 116611992 A | 8/2023 |
| JP | 2008310414 | 12/2008 |

OTHER PUBLICATIONS

International Search Report and Written Opinion in PCT Appl. No. PCT/US2024/038696 mailed Nov. 6, 2024, 8 pages.

*Primary Examiner* — Jae U Yu
(74) *Attorney, Agent, or Firm* — Kowert, Hood, Munyon, Rankin & Goetzel, P.C.; Michael B. Davis; Dean M. Munyon

(57) ABSTRACT

In disclosed embodiment, a graphics processor is configured to operate on data in multiple memory spaces. Data cache circuitry may cache data for the graphics processor circuitry, including data from multiple memory spaces. The data cache circuitry may include tag circuitry configured to compare the following information from access requests to the data cache circuitry with tags of entries in the data cache circuitry: memory space information and a tag portion of a requested address. The tag portion of a requested address may be different (e.g., a different set of bit indices within the address) for at least two of the multiple memory spaces. Disclosed techniques may advantageously facilitate caching for disparate clients with different cache line sizes, address spaces, etc., e.g., in unified memory architectures.

20 Claims, 15 Drawing Sheets

(56) References Cited

U.S. PATENT DOCUMENTS

| | | | |
|---|---|---|---|
| 2015/0309940 A1* | 10/2015 | Kumar | G06F 12/1027 345/506 |
| 2022/0148249 A1 | 5/2022 | Potter et al. | |
| 2022/0350751 A1 | 11/2022 | Koker et al. | |
| 2023/0104845 A1 | 4/2023 | Ray et al. | |

* cited by examiner

Row mapping example

Column mapping example

*Example traditional cache line tag state*
*510*

| Other cache line State 512 | Line Valid 514 | Line Dirty 516 | Tag_addr 518 |
|---|---|---|---|

*Example multi-memory-type sparse-access cacheline tag state*
*520*

| Other cache line state 522 | Line Valid 524 | Byte range fully valid mask (fv) 526 | byte range any dirty valid mask (dv) 528 | mem_ type 532 | mem_ Id 534 | Tag_addr 538 |
|---|---|---|---|---|---|---|

GRAPHICS PROCESSOR CACHE FOR DATA FROM MULTIPLE MEMORY SPACES

The present application claims priority to U.S. Provisional App. No. 63/578,719, entitled "Graphics Processor Cache for Data from Multiple Memory Spaces that Supports Multi-Address Parallel Access," filed Aug. 25, 2023, the disclosure of which is incorporated by reference herein in its entirety.

BACKGROUND

Technical Field

This disclosure relates generally to computer processors and more particularly to data caches.

Description of Related Art

A graphics processor may include various components such as shader cores, texture units, ray tracing accelerators, etc. Shader cores may execute various types of work, such as compute, vertex, and pixel work. Therefore, caches at certain levels in a cache/memory hierarchy may cache data for multiple clients, multiple memory spaces, etc. Similar situations may arise in various other types of processors, where multiple clients may cache data at a level in a cache/memory hierarchy for different memory spaces.

DETAILED DESCRIPTION

Figure 1A:
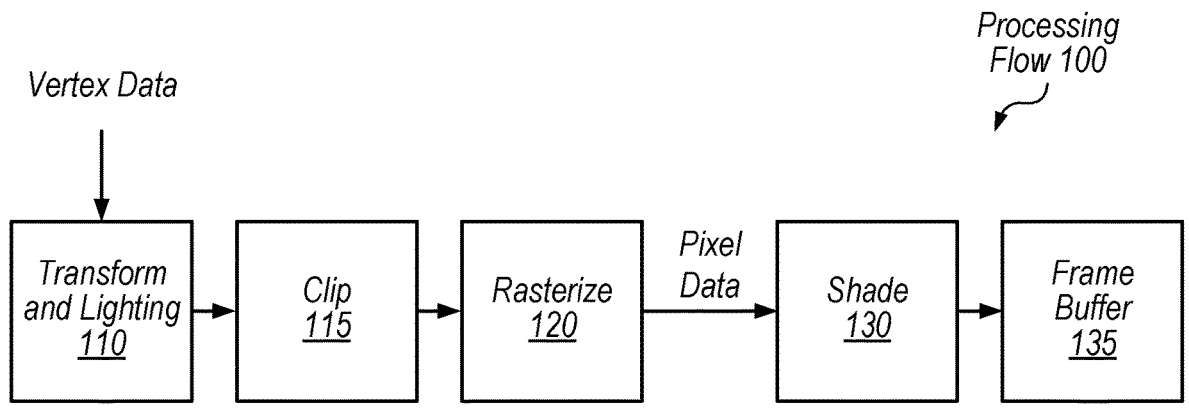
FIG. 1A is a diagram illustrating an overview of example graphics processing operations, according to some embodiments.

A graphics processor may include multiple shader cores. A given shader core may include thread schedulers, execution units, register and memory resources, and various other sub-blocks. The graphics processor may implement multiple memory spaces, which may be memory backed, e.g., in unified memory architectures (note that non-unified memory embodiments are also contemplated, although disclosed techniques may be particularly useful in the context of unified memory). Example memory spaces include thread private, SIMD group scoped, threadgroup scoped, and global spaces. Traditionally, these spaces would have their own separate physical memories/caches, which they might access using different granularities, tags, etc. This approach may involve complex memory access request and data networks.

In some embodiments, a low-level data cache (e.g., an L1 cache) is shared to cache data from various memory spaces (e.g., which may be accessed by different clients). This may advantageously simplify and consolidate request and data networks. The cache may have different tag formats for different memory spaces (and cache requests may identify their memory space as part of the tag to allow proper handling). Various cache circuitry may be parallelized, e.g., to allow parallel tag checks, invalidations, etc. for different address spaces in the same cycle.

To allow multiple simultaneous sub-cache-line granularity accesses from multiple independent requests, the cache may implement a tiered multiple banking configuration that includes multiple tag banks, multiple scheduler banks, multiple data banks and multiple data sub-banks. In such a configuration, each tier of banking may be configured to meet an overall maximum simultaneous request rate and minimum granularity of access. Each request may be mapped via a hash function selected to reduce bank conflicts. Banking may be vertical (row) orientated or horizontal (column) orientated or a combination of both depending on the desired type of simultaneous access at that tier level. Generally, sub-cache-line banking may provide fine granularity cache line access, tag/scheduler/data banking may provide simultaneous pipelined access to such sub-cache-line accesses, and greater banking may increase rate and reduce bank conflicts when requests can be mapped simultaneously onto banks.

Tag memory space identification information may also facilitate occupancy management, e.g., by selecting cache lines for eviction based at least in part on which memory spaces currently have high cache occupancy.

Note that while an L1 is discussed herein for purposes of discussion, similar techniques may be used for caches at various levels in a cache hierarchy. Further, disclosed caching techniques may be used in non-GPU contexts such as caching for multiple components of a system-on-a-chip, caching for other types of processors such as CPUs, etc.

Generally, the different types of data cached by the shared cache may correspond to different logical memory spaces and are mapped onto the same cache address tag storage and cache data storage (e.g., RAMs). The address tag may differentiate each memory space by tagging a given cache line with the corresponding memory type. The data cache may support parallel simultaneous multi-address access (e.g., read+write+atomics) to support streaming SIMT (single-instruction multiple-thread). Parallel accesses may be to different memory types in some situations.

Therefore, speaking generally, the disclosed data cache may: support multiple independent memory spaces that share tag and data storage, allow a given memory space to occupy any percentage of cache (potentially with control or restrictions on occupancy), tag a given cache line with memory space type (mem_type) and memory space identifier (mem_id) (e.g., when there are multiple instantiations of a given memory space type), support parallel tag requests in tag compare logic, support parallel {mem_type, mem_id} compare for simultaneous invalidate (this may allow invalidating all the cached data for a given client in a single cycle, for example), support parallel {mem_type, mem_id} compare for dirty data flush (and data to be flushed may be identified for a given client in a single cycle, for subsequent flushing to a next-level cache), support parallel {mem_type, mem_id} compare for occupancy count, be highly banked for parallel access (which may be combined with address based bank and set hashing for high throughput and high bandwidth performance), provide sub-cache line granularity (fine grained) byte valid+dirty tracking for efficient and parallel sparse access support where sub-cache line granularity (byte chunk range) is memory type dependent (e.g., private memory may access byte chunks of a first size (e.g., N bytes) and device memory may access byte chunks of a second size (e.g., 2N bytes, 1.5N bytes, 4N bytes, etc.), or some combination thereof.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
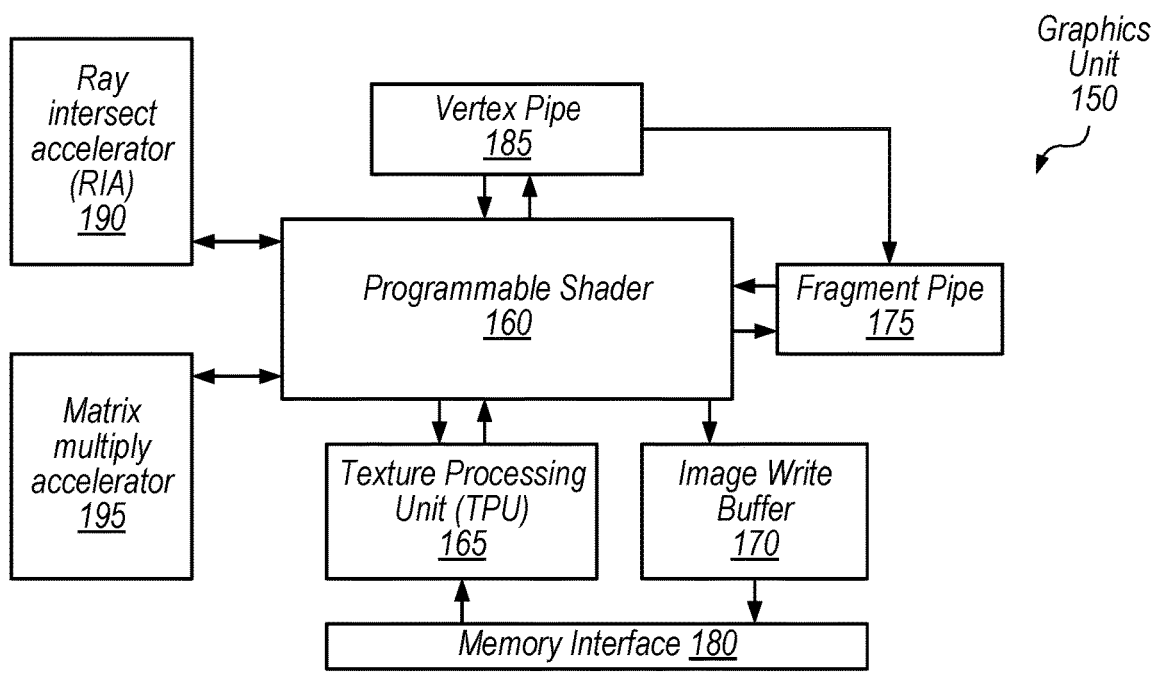
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread) groups, single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger threadgroup of threads that execute the same program, which may be broken up into a number of SIMD groups (within which threads may execute in lockstep) based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

In the illustrated example, graphics unit 150 includes ray intersection accelerator (RIA) 190, which may include hardware configured to perform various ray intersection operations in response to instruction(s) executed by programmable shader 160, as described in detail below.

In the illustrated example, graphics unit 150 includes matrix multiply accelerator 195, which may include hardware configured to perform various matrix multiply operations in response to instruction(s) executed by programmable shader 160, as described in detail below.

Example of Separate Memory Spaces Mapped to Shared Cache

Figure 2:
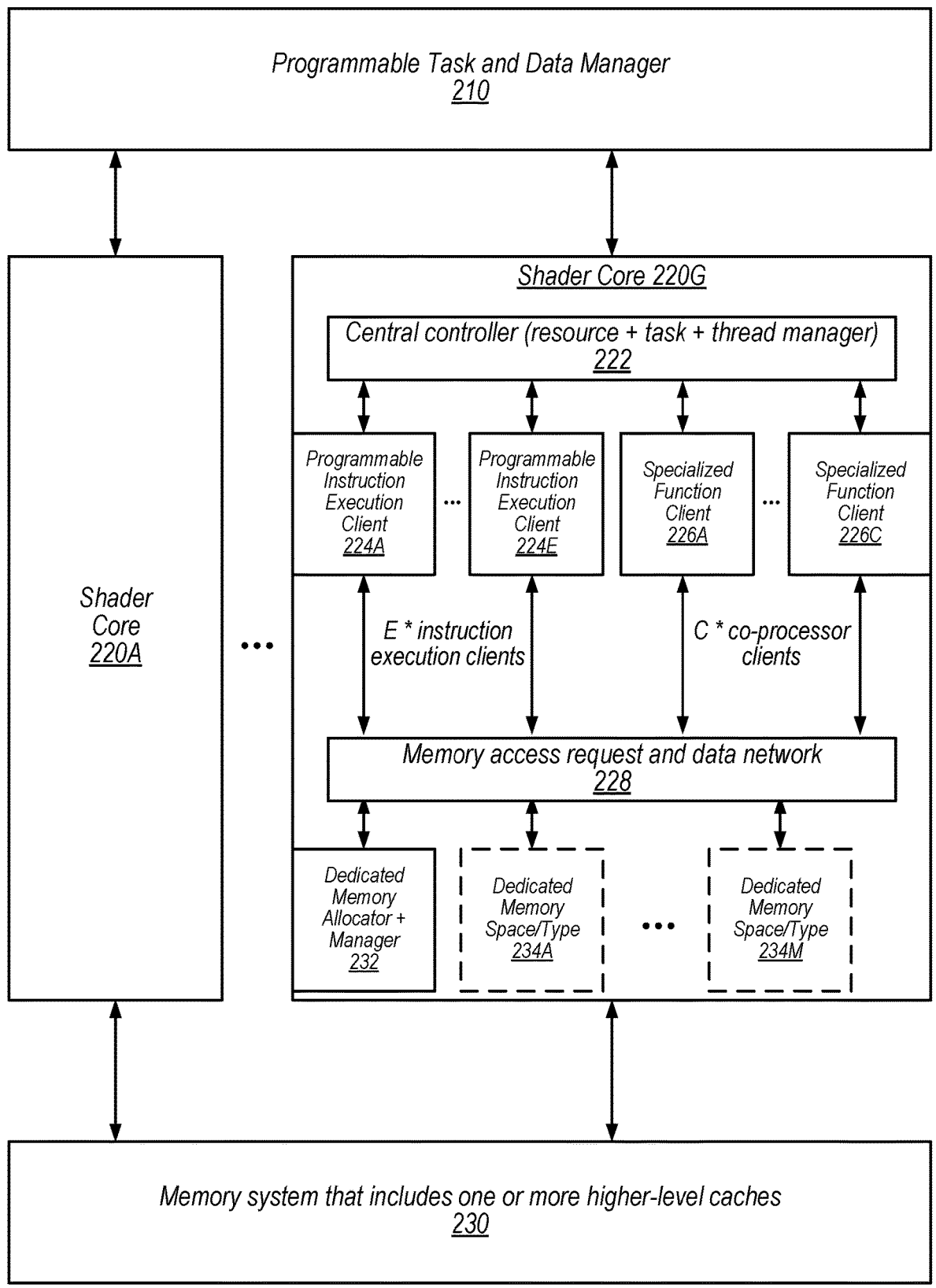
FIG. 2 is a simplified block diagram that shows separate dedicated memories instantiated within a given GPU shader core, according to some embodiments.

FIG. 2 is a simplified block diagram that shows separate dedicated memories instantiated within a given GPU shader core, according to some embodiments. In this example, a programmable task and data manager 210 is configured to send graphics work to multiple shader cores 220A-220G. In this example, each core 220 includes a central controller 222 configured to manage hardware resources, tasks, and threads assigned to the core. Controller 222 is configured to dispatch threads for execution by multiple programmable instruction execution clients 224A-224E (e.g., SIMD pipelines) and multiple specialized function clients 226A-226C (e.g., texture processing pipelines, vertex pipelines, etc.). As shown, the clients have respective interfaces to a memory access request and data network 228. Network 228 provides access to a dedicated memory allocator and manager 232 to gain accesses to multiple dedicated memory spaces/types 234A-M. In the illustrated example, a given shader core 220 is also configured to communicate with a memory system 230, e.g., that includes one or more higher-level caches (which are shared by multiple dedicated shader core caches in this example).

Traditionally, these different memory types 234 may be mapped onto different and dedicated physical memories/caches each with unique interfaces and management. For example, each physical memory may be sized to the maximum required to meet the performance goals. Typically, each physical memory is optimized for the specific access type and usage. These separate physical memories must be connected in some fashion to enable clients to access them.

In addition, a memory allocator/manager may be used to manage each separate memory.

Figure 3:
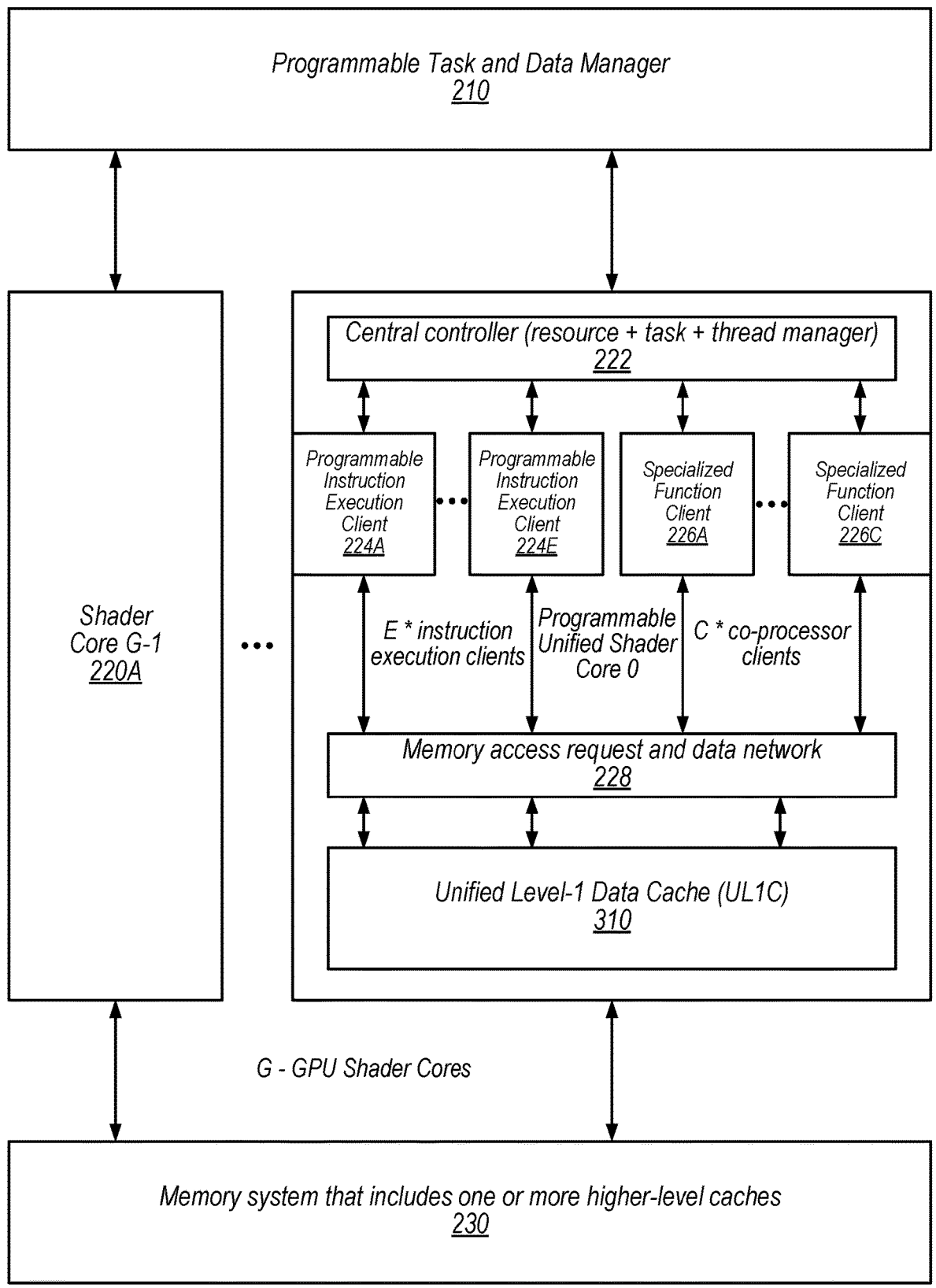
FIG. 3 is a simplified block diagram that shows unified data cache circuitry in a given GPU shader core, according to some embodiments.

In contrast, in disclosed embodiments, multiple different memory types are mapped onto the same physical cache memory and control circuitry manages that unified memory as a memory-backed cache. FIG. 3 is a simplified block diagram that shows a unified level-1 data cache (UL1C) circuitry 310 in a given GPU shader core 220.

The embodiment of FIG. 3 may have various advantages relative to the implementation of FIG. 2, as discussed in detail below. For example, the amount of memory allocated by a given memory type is flexible and scalable. The amount of memory cached per memory type at a given time may be dynamic and workload dependent. Further, the memory access request and data network (e.g., 228) may be substantially simplified and consolidated. The unified data cache may be scalable in size and performance for various bandwidth and throughput targets. Further, new memory types may easily be added.

A shared cache approach may provide various challenges. For example, it may be challenging to design a data cache that supports different access types and provides mechanisms to manage each memory space. Various detailed embodiments, discussed in detail below, address these challenges.

Example Memory Types and Data Mapping

In some embodiments, a GPU shader core supports three basic memory space types. Note that these examples are provided for purposes of explanation and are not intended to limit the scope of the present disclosures. Additional types may be added, disclosed types may be omitted, etc., in various embodiments.

Thread private memory may be a space that is visible on a per thread basis only. This may include register data, for example. Threadgroup shared private memory may be a space that is visible and shared between a specific group of threads. Global memory may be a space that is globally visible and shared between all threads within a program execution context. Note that a given thread may be restricted to specific address ranges.

Figure 4A:
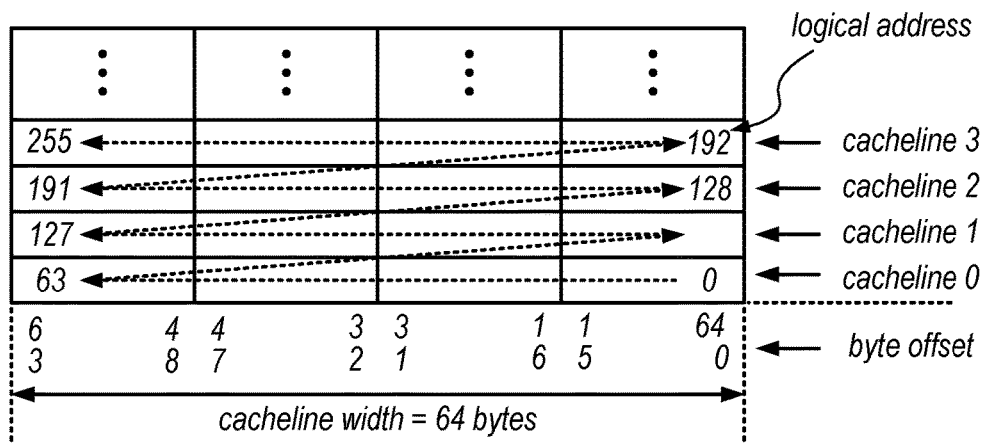
FIG. 4A provides an example row mapping, according to some embodiments.

In some embodiments, the UL1C 310 supports two overall data mapping arrangements: row and column. FIG. 4A provides an example row mapping for a 64B cache line in which a row of data is mapped to a cache line and represents a contiguous region of memory. Each row start address may be contiguous with respect to previous row end address or may be arbitrarily strided to support interleaving.

Figure 4B:
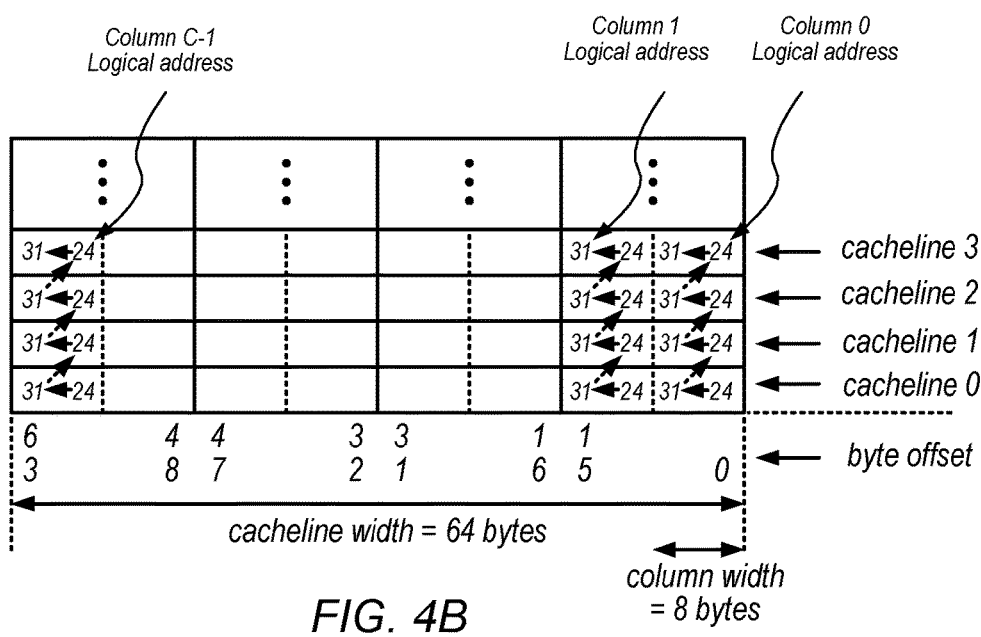
FIG. 4B provides an example column mapping, according to some embodiments.

FIG. 4B provides an example column mapping for a 64B cache line in which multiple column elements of data are mapped to a cache line such that a given column represents a contiguous region of memory. Again, each column element start address may be contiguous with respect to the previous row or strided. Column width may be determined by access requirements. In general, a column entry may correspond to an entity which is to be accessed atomically and in parallel with other column entries which in general may be mapped to different cache lines.

A given client of the cache 310 may utilize row mapping, column mapping, or both.

Example Tag State

In order to support multiple memory types in a unified data cache, control circuitry may support one or more states to identify each memory space, e.g., for tag check qualification and flush/invalidate management. In some embodiments, the memory type is identified by a memory type (mem_type) field and the specific memory space allocation is identified by a memory identifier (mem_id) field (e.g., because there may be multiple instances of a given memory type). These fields along with the tag address (tag_addr) may uniquely identify the memory assigned to a cache line.

Figure 5:
FIG. 5 is a diagram illustrating example differences between traditional cache line tag state and example disclosed tag state, according to some embodiments.
Figure 5:

FIG. 5 is a diagram illustrating example differences between traditional cache line tag state and example disclosed tag state, according to some embodiments. Traditional state 510, in the illustrated example, includes other cache line state 512, line valid field 514 (e.g., a valid bit), line dirty field 516 (e.g., a modified bit) and tag address field 518.

Multi-memory-type sparse-access cache line tag state 520, in the illustrated example, includes other cache line state 522, line valid field 526, and tag address 538 (although note that the number of bits and format of the tag address 538 may vary for different memory types, as discussed in detail below). These fields may correspond to similar fields of state 510. Note that the "other" cache line state 512 and 522 may include replacement information such as least-recently-used status, security information, etc.

In addition, memory type field 532 indicates the type of memory space, in some embodiments, while the memory identifier field 534 indicates a particular instance of a certain type of space, for spaces that are instantiable multiple times. For example, a given thread private space may have a thread_private mem_type and a unique identifier of the space for the mem_id 534 that is distinct from identifiers of other thread private spaces. Note that in some embodiments, both the type and identifier may be encoded together in a single field. As discussed above, the tag address field 538 may be accessed and interpreted based on field 532.

In addition, state 520 includes fine-grained byte value masks: byte range fully valid (fv) mask 526 and byte range any dirty valid (dv) mask 528, in the illustrated example. Each bit in the fully valid mask may correspond to a byte range and indicate whether all bytes associated with that range are valid. Each bit in the dirty valid mask may correspond to a byte range and indicate whether any byte associated with the byte range is dirty.

These byte valid masks may efficiently support sparse access patterns and column data mapping. It should be noted that each memory type may have differently-sized fully-valid and dirty-valid byte masks and these masks need not be the same size. In addition, the tag_addr (tag address) field may be different on a per-memory-type basis depending on logical address range of a memory type. For example, one memory space may use a first set of bits of a request address as the tag_addr and another memory space may use a second set of bits of a request address as the tag_addr, and these different sets of bits may or may not overlap (and may include different numbers of tag_addr bits in some embodiments). These differences may be exploited to reduce the tag state by using different field configurations on a per-memory-type basis.

As one specific example, primary memory may use a 4B range with a 16-bit fully valid field fv[15:0] where fv[i]= &byte_valid[(i+1)*4: i*4] for i=0 . . . 15. In contrast, in this example, global memory may use an 8B range with an 8-bit fully valid field fv[7:0] where fv[i]=&byte_valid[(i+1)*8: i*8] for i=0 . . . 7. In this example, both private and global memory may use the same dirty valid format, e.g., with an 8-bit field fv[7:0] where dv[i]=|byte_dirty[(i+1)*8: i*8] for i=0 . . . 7. In other embodiments, both the fully valid and dirty valid fields may be different among different memory spaces.

Figure 6:
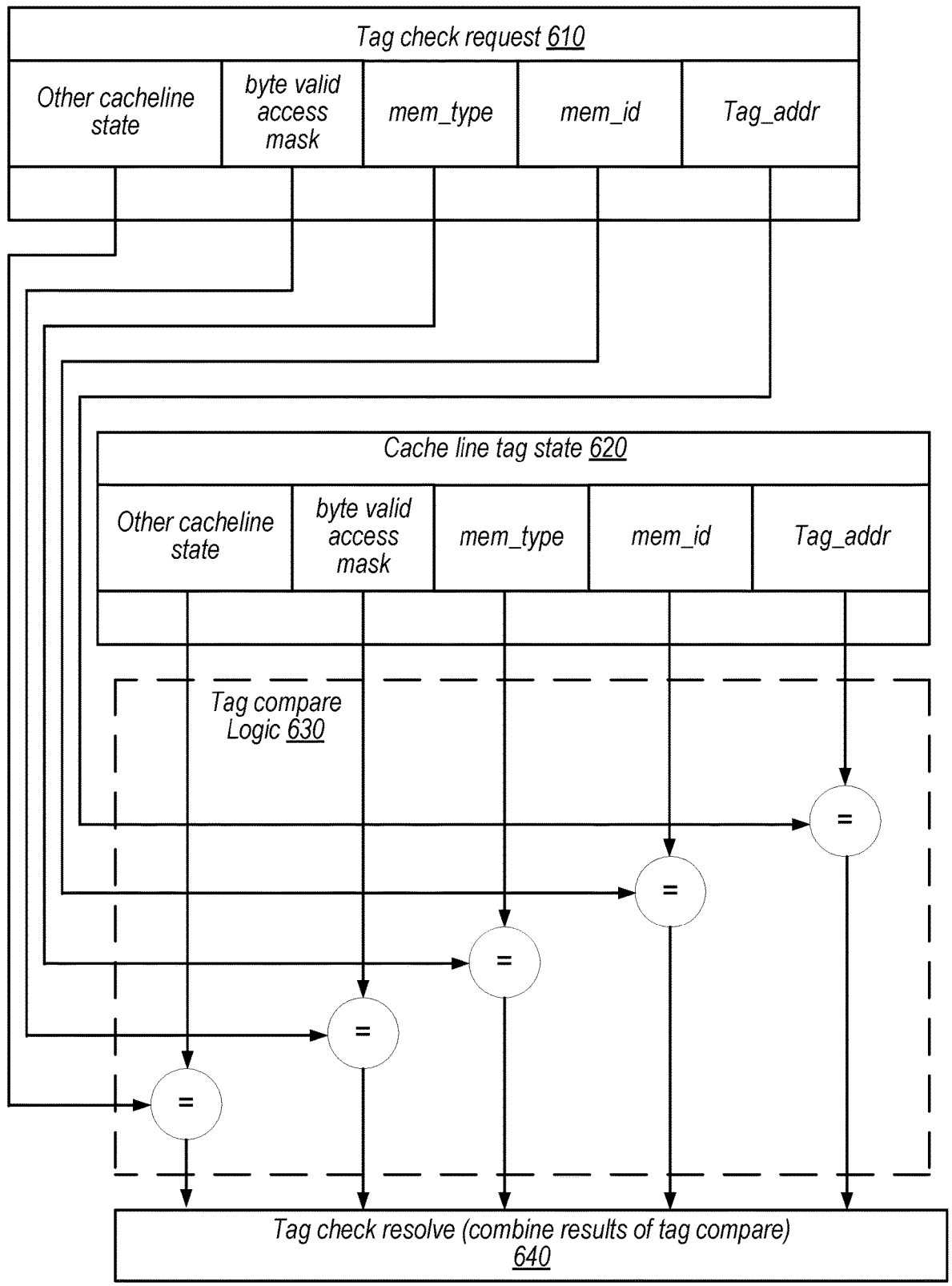
FIG. 6 is a block diagram illustrating example tag check resolve circuitry, according to some embodiments.

FIG. 6 shows example tag check comparison circuitry, according to some embodiments. In the illustrated example, tag compare logic 630 is configured to compare various corresponding fields form a tag check request 610 and cache line tag state 620 for a given cache line (note that multiple cache line tag states may be compared in set-associative cache arrangements and tag compare logic 630 may be replicated across ways in a set). Tag check resolve circuitry 640 is configured to combine the comparison results to provide a hit or miss result and respond to the tag check request.

Tag compare logic 630, in some embodiments, is configured to perform tag checks for multiple memory spaces with different tag formats in parallel. In some embodiments, this involves multiple parallel instances of tag comparison logic even beyond parallelization required for set associativity. Note that the UL1C 310 may be set associative and may have a higher than normal associativity, in some embodiments, relative to a typical associativity of a single memory-type cache at a given cache level.

Various disclosed fields may be used for efficient cache management operations such as flush/invalidate operations and cache occupancy controls. Specifically, a given memory space allocation may be identified by mem_type and mem_id and all matching cache lines may be invalidated, flushed or counted for the purpose of managing occupancy of a given memory type. In some embodiments, control circuitry is configured to invalidate all cache lines for a memory space in a single cycle. Similarly, control circuitry may be configured to identify and mark all dirty cache lines for a memory space for flushing in a single cycle (although the actual flush operations may be performed subsequently). Similarly, control circuitry may be configured to determine the occupancy of a memory space in a single cycle. The performance of these operations may be enabled by parallel instantiations of various tag check circuitry, e.g., across multiple tag banks as discussed in detail below.

Control circuitry may provide cache occupancy management to keep the cache balanced, e.g., to avoid a single memory type from overwhelming or dominating the cache, to maintain a minimum occupancy for a specific memory type, etc. For example, the control circuitry may prioritize cache lines for eviction when those lines belong to a memory space with high occupancy in the cache. The retention priority for a given cache line may be based on a combination of access recency, occupancy of a corresponding memory space, etc. (this information may be stored in field 522, for example). As one example, control circuitry may override a default replacement scheme (such as least-recently-used) to prioritize certain memory types or clients for eviction. Disclosed occupancy management techniques may advantageously provide performance for certain clients (e.g., that are allowed greater occupancy), reduce cache thrashing, etc.

Detailed Example Data Mappings

Figure 7:
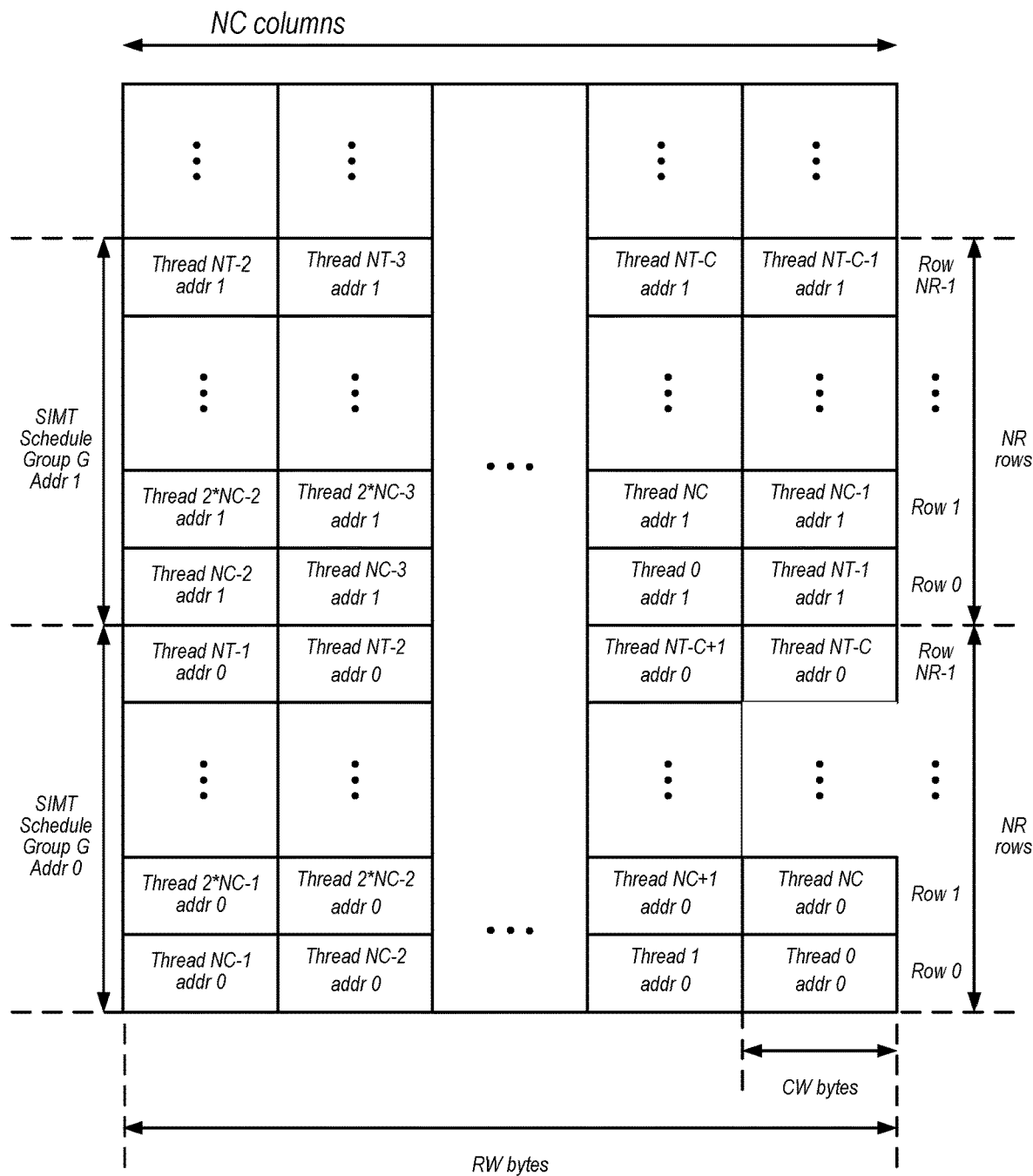
FIG. 7 is a diagram illustrating example column data mapping applied to thread private memory, according to some embodiments.

FIG. 7 illustrates example column data mapping applied to thread private memory, according to some embodiments. In this mapping a given logical address is mapped to a row and each thread occupies a specific column position in that row. The column width and row width are in theory arbitrary. However, it may be preferable to map the row width to some number of cache lines that is an integral multiple of the number of data banks and to restrict the column width to an integral multiple of the RAM sub-bank width (which may correspond to the minimum RAM access granularity). This mapping supports parallel row and column access. It should be noted that for a given thread the column position may be rotated for consecutive row addresses to enable a column to be accessed in parallel for a given thread and also a row of threads to be accessed in parallel.

Figure 8:
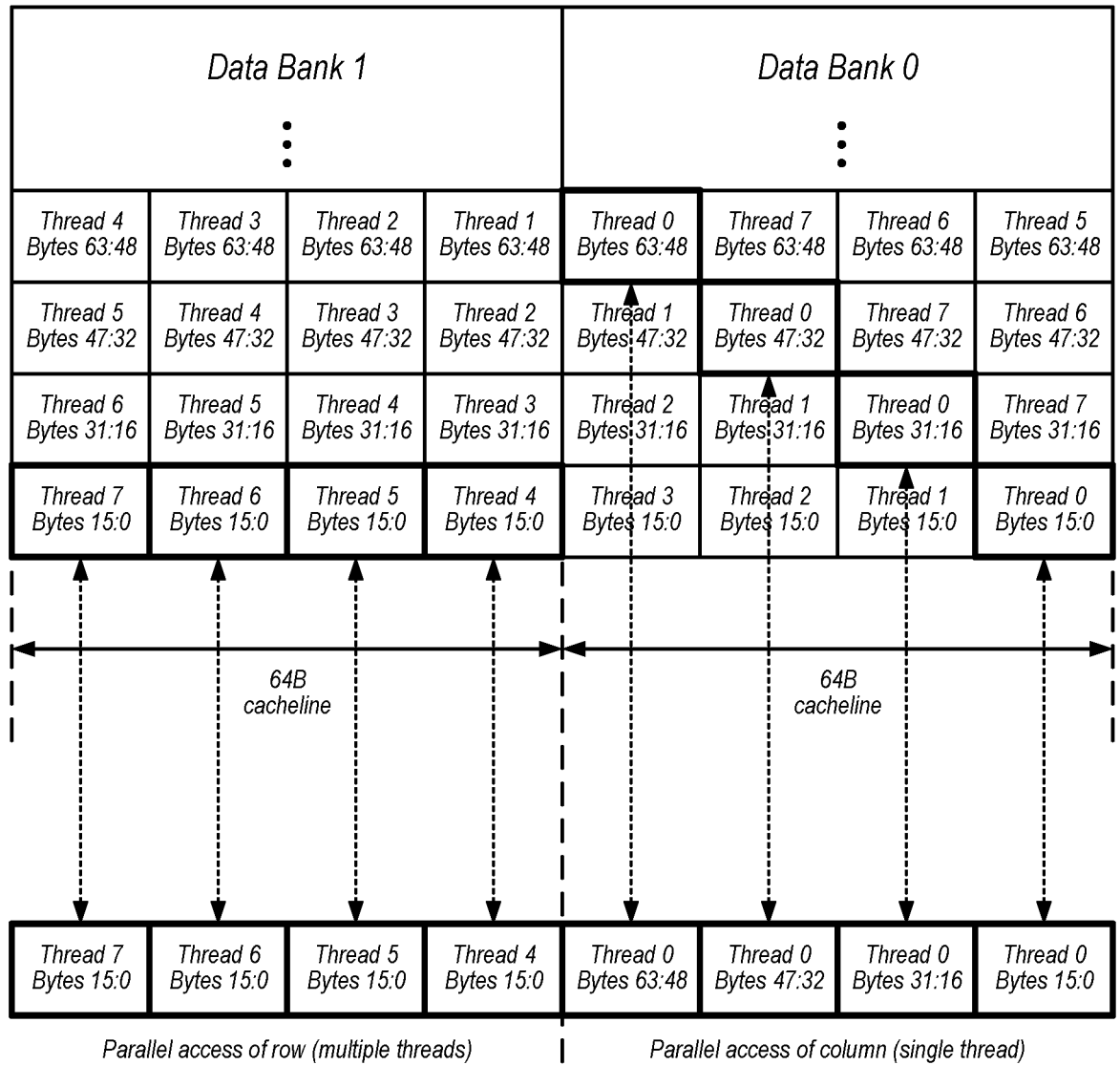
FIG. 8 is a diagram illustrating a more specific example with rotated column data, according to some embodiments.

FIG. 8 illustrates a more specific example rotated column data mapping consisting of a 64B cache line and 16B column width demonstrating a parallel column access and a parallel row access. Only 2 data banks are shown and only 8 threads mapped but this does not preclude mapping to other numbers of banks, threads, or both. Once all banks have been mapped the row may wrap back to bank 0.

When data is transferred from one memory space to another it may be aligned differently. An example is reading data from thread private memory and writing that data to global memory. Therefore, control circuitry may implement a data transpose to transform both read and write data (example data transposers are discussed in detail below with reference to FIG. 10).

Unified Data Cache Block Diagrams

Figure 9:
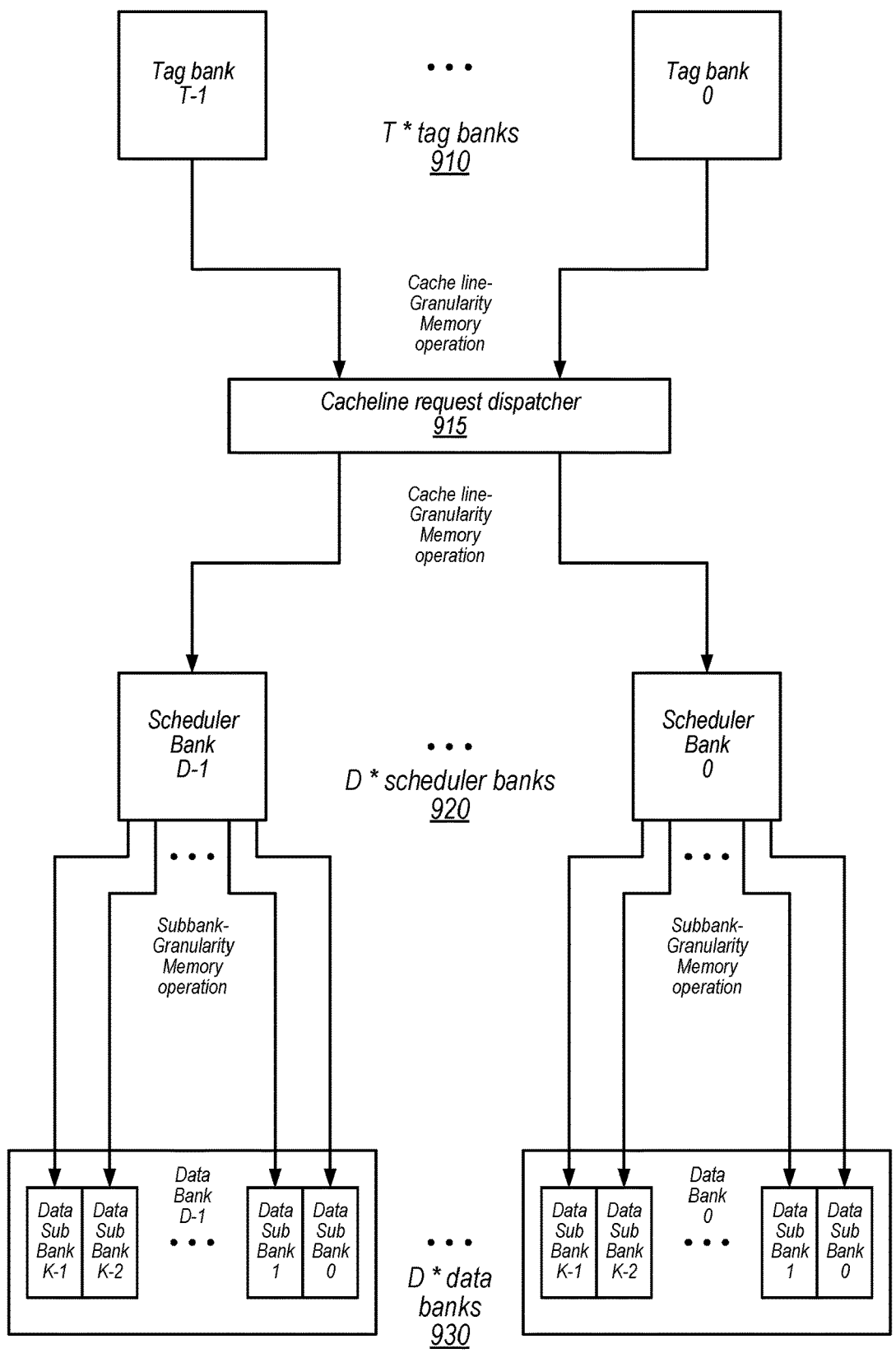
FIG. 9 is a block diagram illustrating a unified cache with tag, scheduler, and data banks, according to some embodiments.

FIG. 9 is a block diagram illustrating a unified cache with tag, scheduler, and data banks, according to some embodiments. Each bank may have one or more read ports and one or more write ports for various underlying storage circuitry. In this example, the data cache includes T tag banks, D scheduler/data-banks, and K sub-banks. Generally, the tag banks 910 may generate control information for the scheduler banks 920 that indicates which data sub-banks should be accessed for a given cache access request from a client. The scheduler banks 920 may then schedule accesses to the data banks 930 accordingly.

Note that there are multiple mapping options for different implementations. For example, as a first option, any tag bank (0 . . . T−1) may map to any data bank (0 . . . D−1). This may utilize a T:D cross-bar dispatcher 915. As a second option, the mapping may be restricted to 1:1 (e.g., each tag bank maps to only one data bank), which may not utilize a dispatcher 915 at all. As other options, various levels of mapping granularity may be supported between the first and second options.

In some embodiments, tag banks 910 are implemented using content-addressable memories (CAMs). In other embodiments tag banks 910 are implemented using RAM+ compare (e.g., a RAM combined with a vector of compares where tag information for a set is read out and input to parallel compare logic for each way). An incoming request to tag control logic (not explicitly shown) may contain one or more accesses to all or a portion of a cache line (e.g., to a portion of a data sub bank, a data sub bank or to multiple data sub banks). The control circuitry may decode incoming requests and appropriately distribute tag check requests to one or more tag banks 910. Each tag bank 910 may independently perform tag comparisons (e.g., of a portion of incoming addresses with address information in a latch array), allocate lines, and dispatch writes if needed. Dispatch logic in tag banks 910, cache line request dispatcher 915, or both may then select requests to send to one or more scheduler banks 920. The tag control logic may also signal to a requesting client when it has accepted a request.

In some embodiments, each tag bank 910 is responsible for a subset of the sets of the cache. For example, tag bank T−1 may be responsible for sets 0, N, 2N, etc. another tag bank responsible for sets 1, N+1, 2N+1, etc., (with other banks assigned to other sets similarly, depending on the value of N).

In some embodiments, to evenly distribute device memory accesses across banks and sets, a configurable hash may operate on address information (e.g., on upper virtual address bits), potentially along with other information (e.g., the identifier of the requesting set of graphics work) to generate hashed bank and hashed set information. The hashed information may be used to actually distribute requests to tag banks. These hashes may then be reversed before sending memory requests to the memory hierarchy (e.g., for evictions or fill requests).

As discussed above, a given tag bank may perform a tag comparison operation differently (e.g., on different address tag bits) depending on the memory type identifier portion of the tag. Similarly, the tag bank may check fully valid and dirty valid information differently for different memory space types. As discussed above, the tag information may involve various fields in addition to a portion of the requested address, such as memory type identifier, memory space identifier, etc. The tag control logic may further determine a way to be evicted for allocating a new line, e.g., using various validity, modified, persistence, memory space type, occupancy, pseud-randomness, etc. information as inputs.

Scheduler banks 920 may include control logic to determine which data bank to access based on information from the tag tanks (e.g., hits and misses, fully valid/dirty valid information, etc.). The scheduler logic may be banked for timing reasons. Generally, scheduler banks 920 may attempt to maximize utilization of groups of sub-banks, reduce latency, or some combination thereof, without violating memory ordering rules. Scheduler banks may also manage and support various performance or power features.

In some embodiments, the scheduler circuitry (e.g., one or more banks 920) maintains strict ordering of operations to the same memory address, e.g., by ordering on a cache-line basis (e.g., set/way) unless no cache line is assigned (in which case ordering may be on a tag/bank basis as a proxy for memory address). The scheduler circuitry may implement independent schedulers for reads and writes on a sub-bank basis (at sub-cache-line granularity), where each scheduled operation is to a different cache line address. Thus, only necessary sub banks may be accessed for a given cache line operation. The scheduler circuitry may include storage for buffering long latency operations (such as fill requests to a next-level cache) and queuing of cache line dependency chains. This storage may be banked, shared, and arranged differently than sub-bank schedulers.

In some embodiments, the scheduler banks 920 implement ordering policies between operations to different cache lines. These may include age-based policies (e.g., based on the order in which the scheduler received requests from a tag bank), quality-of-service (QOS)-based policies (e.g., to guarantee clients a certain throughput rate, which may be fixed, programmable, or dynamically controlled), round-robin, multi-level priority based, group-based (e.g., where operations are tagged by group identifier and groups are prioritized such that operations belonging to a group are scheduled together), may guarantee forward progress, or some combination thereof.

In some embodiments, the scheduler banks 920 are configured to allocate or deallocate temporary buffer storage such as a write buffer for store data, a read buffer for load data, a fill buffer for data retrieved from the next level cache, an evict buffer for write data to the next level cache, etc. In some embodiments, scheduler banks 920 are configured to generate control packets for signaling completion of requests or various other events. In some embodiments, scheduler banks 920 are configured to unroll a given cache line request from a tag bank 910 into a sequence of cache line operations. In some embodiments, scheduler banks 920 support local atomics (or read-modify-write operations generally) where the data in a given byte range is read from the cache line, used as an input to a functional unit (potentially along with other input data associated with a request) to generate a result, and the result is written back to the same byte range in the same cache line.

In some embodiments, a hierarchy may include two or more levels of scheduler banks. For example, an upper level may be a cache-line granularity scheduler that dispatches operations to a lower level sub-bank granularity scheduler which may implement various operations discussed above.

Note that each sub-bank may support one read and one write simultaneously to a different cache line (which may be most area efficient for a RAM). In other embodiments, each sub-bank may support multiple read ports, multiple write ports, or both, in which case schedulers may be duplicated per port.

The data banks 930 may be random access memories, for example. As shown, each data bank 930 may include a number of sub-banks. Each sub-bank may include scheduler circuitry and return data line buffers, for example, for its RAM. The scheduler banks may initiate memory operations at sub-bank granularity and may access one or more sub-banks for a given data cache access, depending on the size of the requested operation.

Therefore, in disclosed embodiments, a request from a given client may be hashed and distributed to one or more tag banks which may initiate one or more memory operations depending on the tag check result. One or more scheduler banks may distribute the operations to one or more data sub-banks to properly service the request depending on the memory space type, action to be performed, etc. Handling requests using the tag/scheduler/data sub-bank approach may facilitate parallel accesses even for clients accessing different memory spaces, efficient distribution of requests across the data banks, accesses to different numbers of bytes (e.g., cache line and sub-cache-line accesses), accesses with different tag formats, etc.

Note that full crossbar implementations may have one or more disadvantages. For example, a T:D crossbar is difficult to physically implement due to wiring congestion, a T:D crossbar may utilize an extra pipeline cycle, and a T:D crossbar may not scale well (e.g., because it couples all tag banks to all data banks and is therefore may not scale well). Therefore, in some embodiments, a 1:1 mapping may be implemented (e.g., as discussed below with reference to FIG. 11), or a mapping that is closer to 1:1 than a full crossbar.

In some embodiments, even distribution across tag banks, data banks, and sub-banks may provide the best overall throughput. In some embodiments, control circuitry controls distribution using an address-based hash of the tag bank and data bank index to evenly distribute across tag banks and data banks. In some embodiments, control circuitry may explicitly map data to avoid tag bank and data bank conflicts.

In addition, to absorb temporal imbalances, a given arbitration/dispatch/scheduling point may include request buffers which allow requests targeting different banks to be processed independently and out of order with respect to each other.

Note that various elements of FIG. 9 that are not currently in use (e.g., due to lack of corresponding hits) may be gated to reduce overall power consumption.

Figure 10:
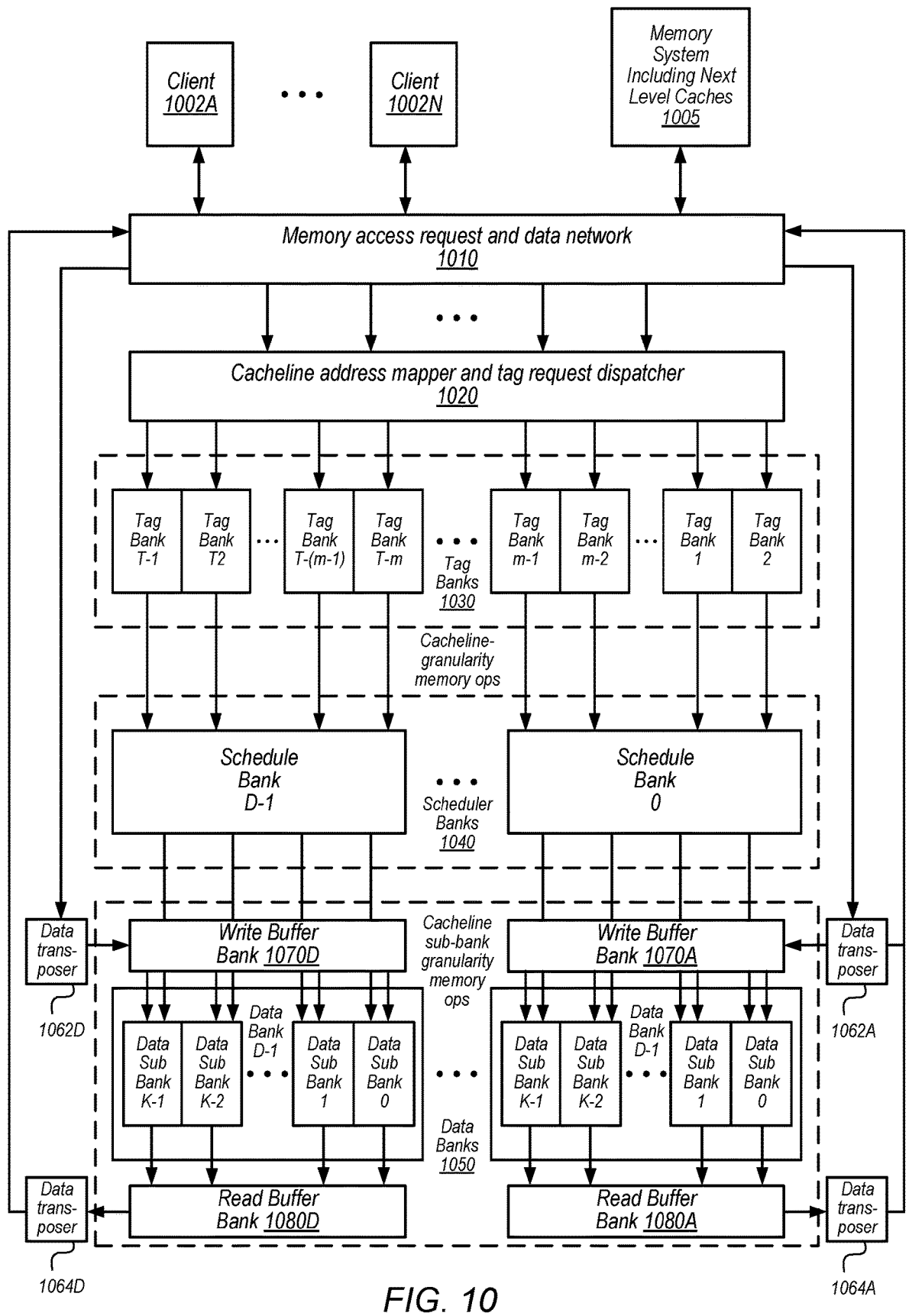
FIG. 10 is a detailed block diagram illustrating a detailed example unified data cache with buffer banks and transposers, according to some embodiments.

FIG. 10 shows a more detailed block diagram of UL1C, according to some embodiments. In the illustrated embodiment, multiple clients 1002A-1002N access the data cache via memory access request and data network 1010, which is also configured to communicate with one or more other caches in the memory system 1005. Memory access request and data network 1010 is configured to send request to cache-line address mapper and tag request dispatcher circuitry 1020, which routes requests to the appropriate tag bank(s), e.g., using one or more hashing functions as discussed above. Tag banks 1030 send cache-line granularity memory operations to the schedule banks 1040, which send sub-bank granularity memory operations (e.g., reads and writes) to the sub banks of the databanks 1050.

Write buffers 1070A-1070D are configured to buffer write data to be written to the data sub banks. Read buffers 1080A-1080D are configured to buffer read data accessed from the data sub-banks.

As shown, data transposers 1062A-1062D and 1064A-1064D may be connected to the write buffers and read banks to transpose data for writing to the data sub-banks or sending back to a given client 1002. This may facilitate column/row parallel accesses, e.g., as discussed above with reference to FIGS. 7-8. The data transposers may be crossbar circuits, for example, and may be controlled based on the access request from the client.

Figure 11:
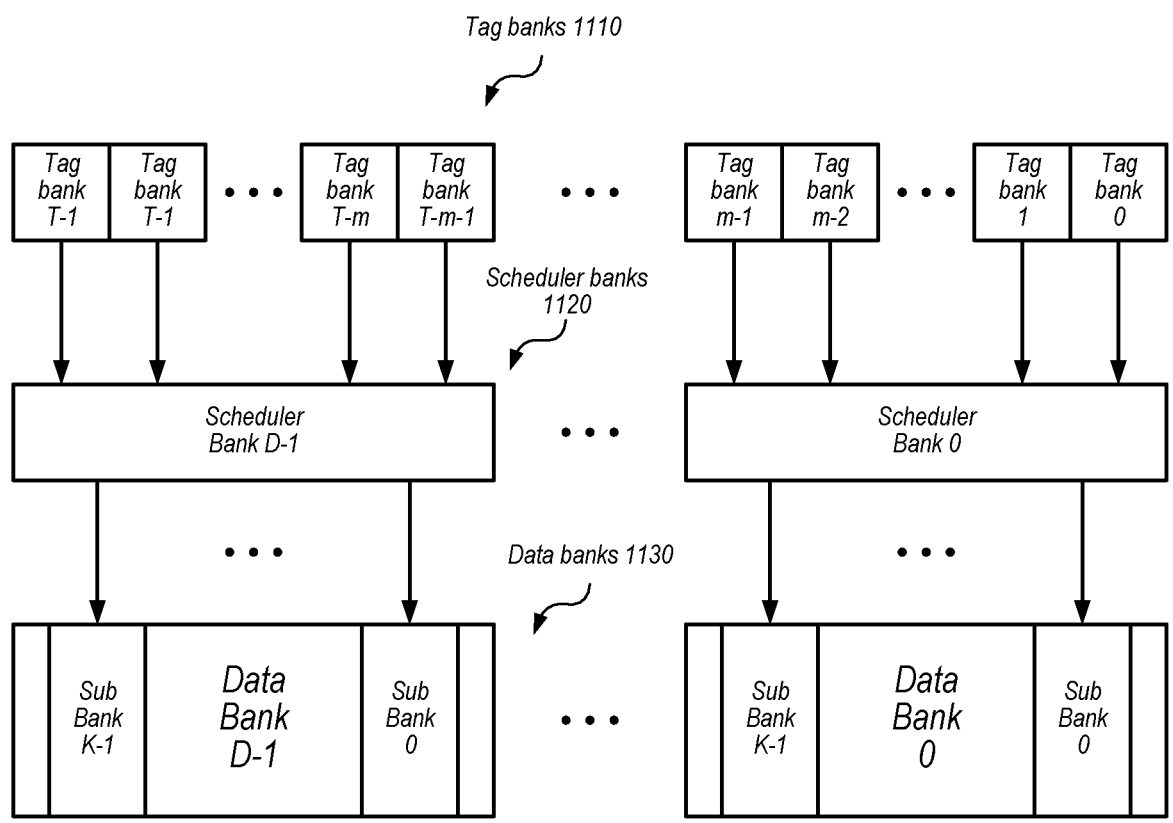
FIG. 11 is a block diagram illustrating a generalized example banking configuration with a 1:1 mapping of tag banks to data banks, according to some embodiments.

FIG. 11 shows an example 1:1 mapping with tag bank grouping where each tag bank is mapped to one schedule/data bank such that m tag banks are grouped per schedule/data bank, according to some embodiments.

Mapping m tag banks to a single data bank may support parallel scheduling of non-conflicting sparse memory access operations. For example if each tag bank delivers one cache line request which only accesses one sub-bank (sparse access) then it may be possible to schedule a different cache line request for each sub-bank (0 . . . k−1) in the same cycle. This may be referred to as sparse cache line access merging and is achieved by scheduling requests to each sub-bank independently.

Note that a general assumption in the illustrated examples is that each bank is 1R1W ported (single read-port and single write-port), which may provide high speed and low area. This applies to tag banks (single address tag check and single entry update/write) and scheduler/data banks (single read operation+write operation per sub-bank per cycle), for example. Multiple accesses per cycle are supported by banking, in these examples. However, this is not a strict requirement and multiple read ports and/or multiple write ports may be implemented in other embodiments. In that case the number of read ports (nr) and number of write ports (nw) of each multi-port bank should be factored into various calculations included herein. Said another way, portions of the present discussion assume nr=1 and nw=1 for simplicity of explanation.

A packed access may access all K sub-banks of a data bank while other accesses may access a proper sub-sets of a data bank (a sub-line access). In general, it may be preferable if m>=k to increase the likelihood of fully packed sparse cache line access merging.

Example Method

Figure 12:
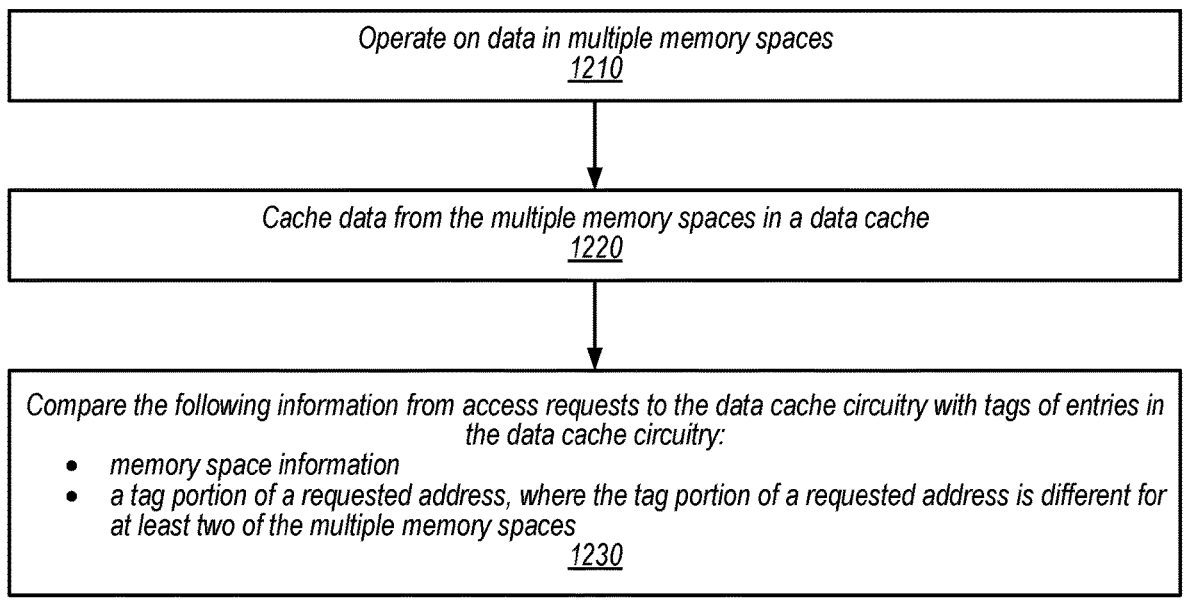
FIG. 12 is a flow diagram illustrating an example method, according to some embodiments.

FIG. 12 is a flow diagram illustrating an example method, according to some embodiments. The method shown in FIG. 12 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1210, in the illustrated embodiment, a computing system operates on data in multiple memory spaces. In some embodiments, the multiple memory spaces include at least: a device memory space, a thread private memory space, a single-instruction multiple-data (SIMD) group memory space, and a threadgroup memory space.

At 1220, in the illustrated embodiment, the computing system caches data from the multiple memory spaces in a data cache (e.g., cache 310).

At 1230, in the illustrated embodiment, the computing system (e.g., tag banks 910) compares the following information from access requests to the data cache circuitry with tags of entries in the data cache circuitry: memory space information and a tag portion of a requested address, where the tag portion of a requested address is different for at least two of the multiple memory spaces.

In some embodiments, the memory space information includes: a memory type identifier that identifies a category of memory space and a memory space identifier that identifies an instance of the category of memory space.

In some embodiments, the multiple memory spaces share tag storage circuitry (e.g., in tag banks 910) and data storage circuitry (e.g., in data banks 930) of the data cache circuitry. In some embodiments, the tag circuitry is configured to perform tag checks for first and second requests in parallel, where the first and second requests use different tag portions of their respective requested addresses. For example, one tag bank 910 may perform a tag check using a different set of bits of a requested address than another tag bank 910 in the same cycle. Similarly, different tag banks may compare other parts of a tag differently in a given cycle (e.g., for requests for different memory spaces with different fully valid or dirty valid formats).

In some embodiments, invalidate control circuitry is configured to invalidate all entries in the data cache circuitry for a given memory space in a single cycle. In some embodiments, flush control circuitry is configured to identify all entries in the data cache circuitry for a given memory space, in a single cycle, for subsequent flushing to a next cache level. In some embodiments, occupancy management circuitry is configured to determine occupancy parameters for the data cache circuitry and one or the multiple memory spaces based on the memory space information (and may determine occupancy for a given memory space in a single cycle, in some embodiments).

In some embodiments, the data cache circuitry is configured to store and provide data at different granularities for different memory spaces of the multiple memory spaces. For example, the data cache circuitry may be configured to perform cache operations based on tag state fields that include: valid range information that indicates whether data associated a first address range is valid and whether data associated with a second address range is valid and dirty range information that indicates whether data associated a first address range is dirty and whether data associated with a second address range is dirty. This may facilitate tag checks for cached data of different widths. In some embodiments, the valid range information has different formats for at least two different address spaces of the multiple memory spaces.

In some embodiments, the data cache circuitry includes multiple data bank circuits configured to store the cached data, the tag circuitry includes multiple tag banks configured to compare tag information from requests with tag information for cache entries, and the data cache circuitry includes multiple schedule circuits configured to determine a set of data banks to access for a given request based on comparison results generated by the tag banks, including to determine to access different numbers of data bank circuits (e.g., data sub-banks) for access requests of different granularities. In some embodiments, the schedule circuitry is configured to determine the set of data banks for a given access request based on address-based bank and set hashing.

In some embodiments, the schedule circuits are configured to: maintain ordering of operations to a given cache line (where one or more cache lines are implemented using multiple data sub-banks) and independently schedule multiple access operations to different data sub-banks for a given operations to a cache line. In some embodiments, the schedule circuits include multiple hierarchical levels, including: a first level configured to schedule operations at cache line granularity and a second level configured to schedule operations from the first level at sub-cache-line granularity. In some embodiments, the schedule circuits are configured to perform one or more of the following: buffer long-latency operations, enforce scheduling policies between operations to different cache lines, buffer store data, load data, fill data, and eviction data, signal completion of access operations, unroll a request from a tag bank into a multi-operation sequence, and perform local atomic operations to a given byte range using one or more atomic functional units.

In some embodiments, write buffer circuitry is configured to buffer data to be written to the data bank circuits. In some embodiments, read buffer circuitry is configured to buffer data read from the data bank circuits. In some embodiments, transpose circuitry is configured to transpose data for the write buffer circuitry and from the read buffer circuitry. In some embodiments, the transpose circuitry enables both parallel row accesses and parallel column accesses to data stored in the data cache circuitry for one of the multiple memory spaces.

Example Device

Figure 13:
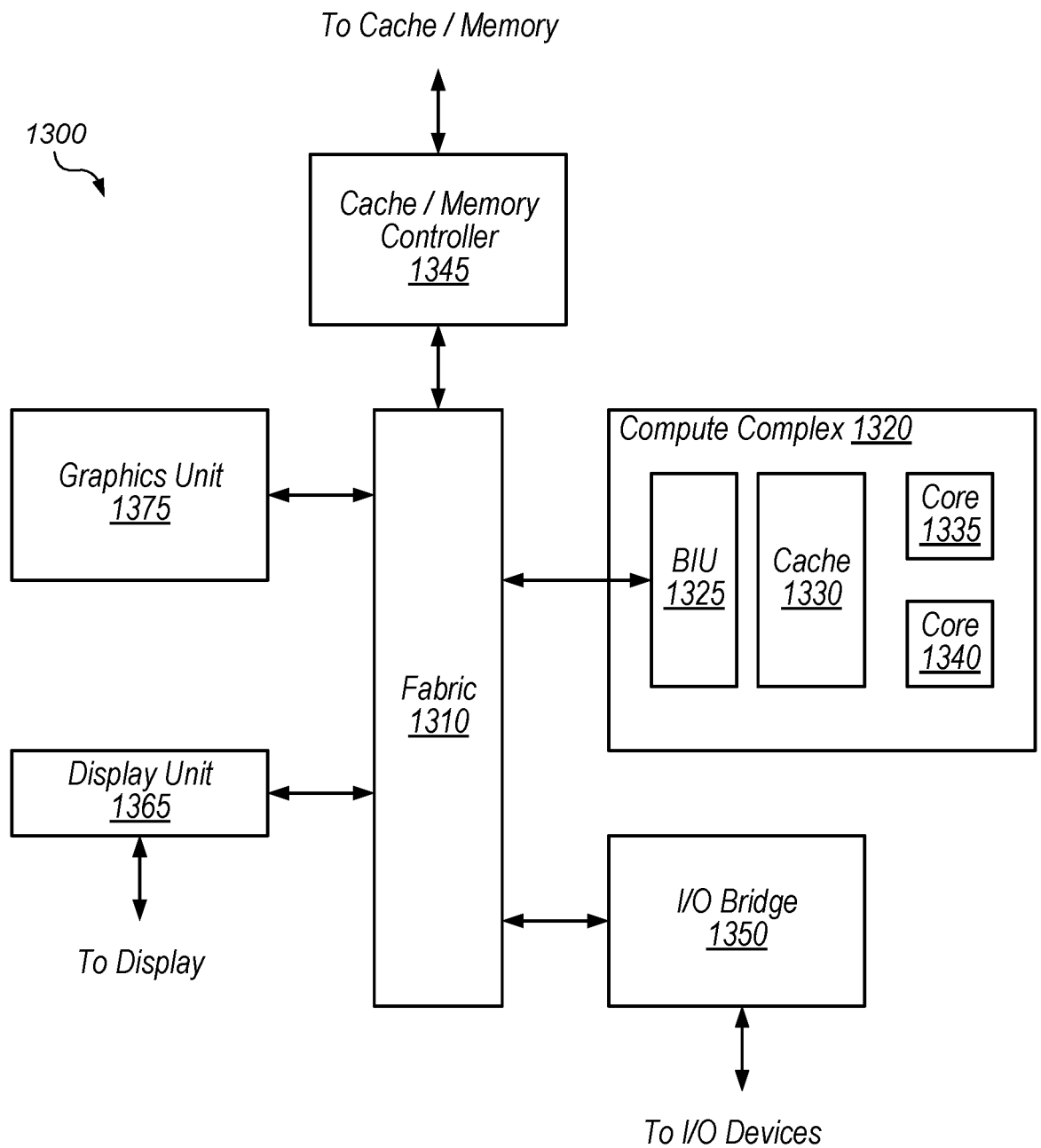
FIG. 13 is a block diagram illustrating an example computing device, according to some embodiments.

Referring now to FIG. 13, a block diagram illustrating an example embodiment of a device 1300 is shown. In some embodiments, elements of device 1300 may be included within a system on a chip. In some embodiments, device 1300 may be included in a mobile device, which may be battery-powered. Therefore, power consumption by device 1300 may be an important design consideration. In the illustrated embodiment, device 1300 includes fabric 1310, compute complex 1320 input/output (I/O) bridge 1350, cache/memory controller 1345, graphics unit 1375, and display unit 1365. In some embodiments, device 1300 may include other components (not shown) in addition to or in place of the illustrated components, such as video processor encoders and decoders, image processing or recognition elements, computer vision elements, etc.

Fabric 1310 may include various interconnects, buses, MUX's, controllers, etc., and may be configured to facilitate communication between various elements of device 1300. In some embodiments, portions of fabric 1310 may be configured to implement various different communication protocols. In other embodiments, fabric 1310 may implement a single communication protocol and elements coupled to fabric 1310 may convert from the single communication protocol to other communication protocols internally.

In the illustrated embodiment, compute complex 1320 includes bus interface unit (BIU) 1325, cache 1330, and cores 1335 and 1340. In various embodiments, compute complex 1320 may include various numbers of processors, processor cores and caches. For example, compute complex 1320 may include 1, 2, or 4 processor cores, or any other suitable number. In one embodiment, cache 1330 is a set associative L2 cache. In some embodiments, cores 1335 and 1340 may include internal instruction and data caches. In some embodiments, a coherency unit (not shown) in fabric 1310, cache 1330, or elsewhere in device 1300 may be configured to maintain coherency between various caches of device 1300. BIU 1325 may be configured to manage communication between compute complex 1320 and other elements of device 1300. Processor cores such as cores 1335 and 1340 may be configured to execute instructions of a particular instruction set architecture (ISA) which may include operating system instructions and user application instructions. These instructions may be stored in computer readable medium such as a memory coupled to memory controller 1345 discussed below.

Note that while various GPU embodiments are discussed herein, similar techniques may be used for various processors with clients that access a cache in different ways, potentially including embodiment of compute complex 1320, other caches of the illustrated system, etc.

As used herein, the term "coupled to" may indicate one or more connections between elements, and a coupling may include intervening elements. For example, in FIG. 13, graphics unit 1375 may be described as "coupled to" a memory through fabric 1310 and cache/memory controller 1345. In contrast, in the illustrated embodiment of FIG. 13, graphics unit 1375 is "directly coupled" to fabric 1310 because there are no intervening elements.

Cache/memory controller 1345 may be configured to manage transfer of data between fabric 1310 and one or more caches and memories. For example, cache/memory controller 1345 may be coupled to an L3 cache, which may in turn be coupled to a system memory. In other embodiments, cache/memory controller 1345 may be directly coupled to a memory. In some embodiments, cache/memory controller 1345 may include one or more internal caches. Memory coupled to controller 1345 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 1345 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 1320 to cause the computing device to perform functionality described herein.

Graphics unit 1375 may include one or more processors, e.g., one or more graphics processing units (GPUs). Graphics unit 1375 may receive graphics-oriented instructions, such as OPENGL®, Metal®, or DIRECT3D® instructions, for example. Graphics unit 1375 may execute specialized GPU instructions or perform other operations based on the received graphics-oriented instructions. Graphics unit 1375 may generally be configured to process large blocks of data in parallel and may build images in a frame buffer for output to a display, which may be included in the device or may be a separate device. Graphics unit 1375 may include transform, lighting, triangle, and rendering engines in one or more graphics processing pipelines. Graphics unit 1375 may output pixel information for display images. Graphics unit 1375, in various embodiments, may include programmable shader circuitry which may include highly parallel execution cores configured to execute graphics programs, which may include pixel tasks, vertex tasks, and compute tasks (which may or may not be graphics-related).

In some embodiments, disclosed techniques may advantageously improve performance, power consumption, etc. of graphics unit 1375, relative to implementations that do not implement various disclosed shared data cache techniques.

Display unit 1365 may be configured to read data from a frame buffer and provide a stream of pixel values for display. Display unit 1365 may be configured as a display pipeline in some embodiments. Additionally, display unit 1365 may be configured to blend multiple frames to produce an output frame. Further, display unit 1365 may include one or more interfaces (e.g., MIPI® or embedded display port (eDP)) for coupling to a user display (e.g., a touchscreen or an external display).

I/O bridge 1350 may include various elements configured to implement: universal serial bus (USB) communications, security, audio, and low-power always-on functionality, for example. I/O bridge 1350 may also include interfaces such as pulse-width modulation (PWM), general-purpose input/output (GPIO), serial peripheral interface (SPI), and inter-integrated circuit (I2C), for example. Various types of peripherals and devices may be coupled to device 1300 via I/O bridge 1350.

In some embodiments, device 1300 includes network interface circuitry (not explicitly shown), which may be connected to fabric 1310 or I/O bridge 1350. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 1300 with connectivity to various types of other devices and networks.

Example Applications

Figure 14:
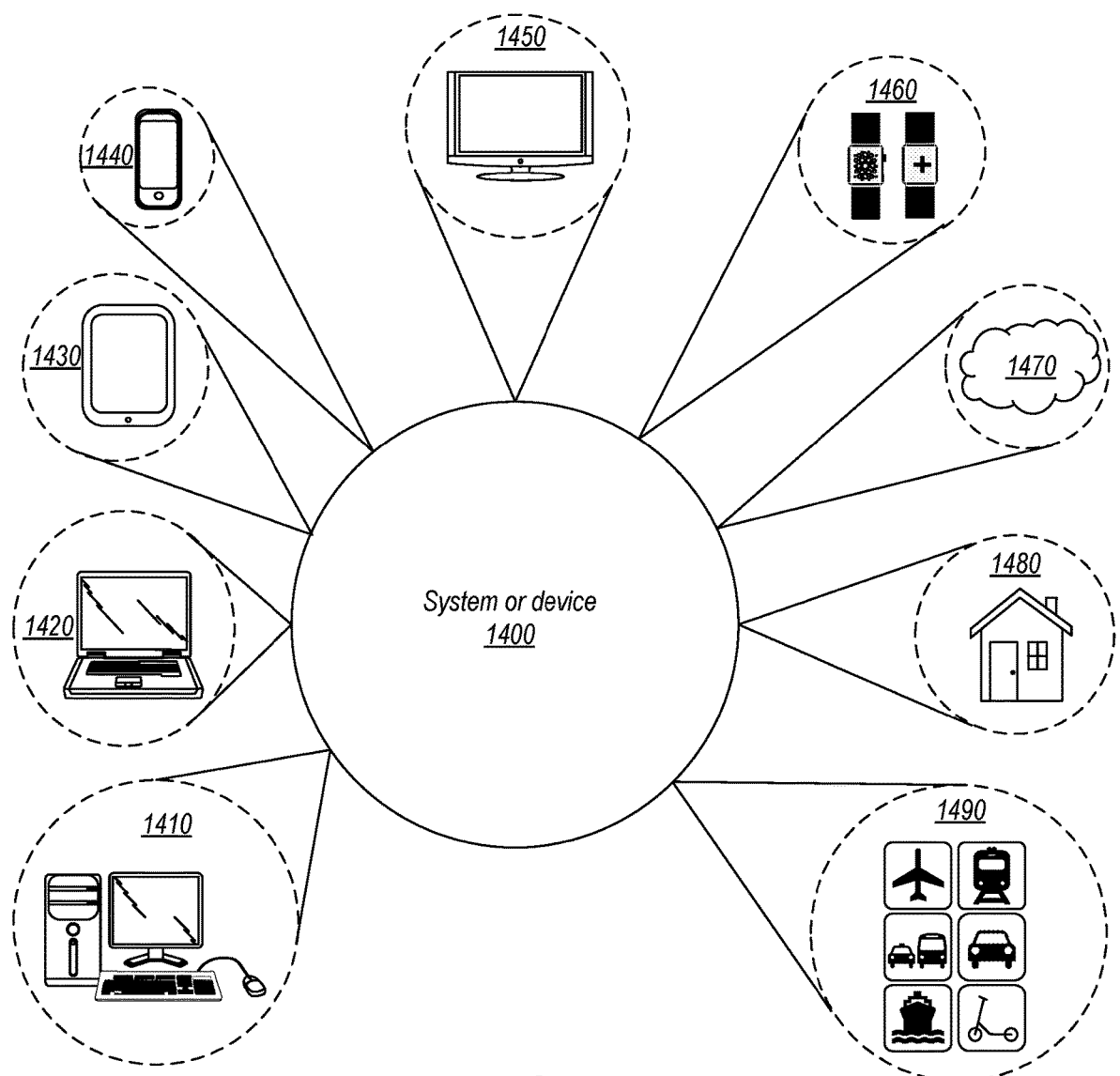
FIG. 14 is a diagram illustrating example applications of disclosed systems and devices, according to some embodiments.

Turning now to FIG. 14, various types of systems that may include any of the circuits, devices, or system discussed above. System or device 1400, which may incorporate or otherwise utilize one or more of the techniques described herein, may be utilized in a wide range of areas. For example, system or device 1400 may be utilized as part of the hardware of systems such as a desktop computer 1410, laptop computer 1420, tablet computer 1430, cellular or mobile phone 1440, or television 1450 (or set-top box coupled to a television).

Similarly, disclosed elements may be utilized in a wearable device 1460, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1400 may also be used in various other contexts. For example, system or device 1400 may be utilized in the context of a server computer system, such as a dedicated server or on shared hardware that implements a cloud-based service 1470. Still further, system or device 1400 may be implemented in a wide range of specialized everyday devices, including devices 1480 commonly found in the home such as refrigerators, thermostats, security cameras, etc. The interconnection of such devices is often referred to as the "Internet of Things" (IoT). Elements may also be implemented in various modes of transportation. For example, system or device 1400 could be employed in the control systems, guidance systems, entertainment systems, etc. of various types of vehicles 1490.

The applications illustrated in FIG. 14 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that programs a computing system to generate a simulation model of the hardware circuit, programs a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 15:
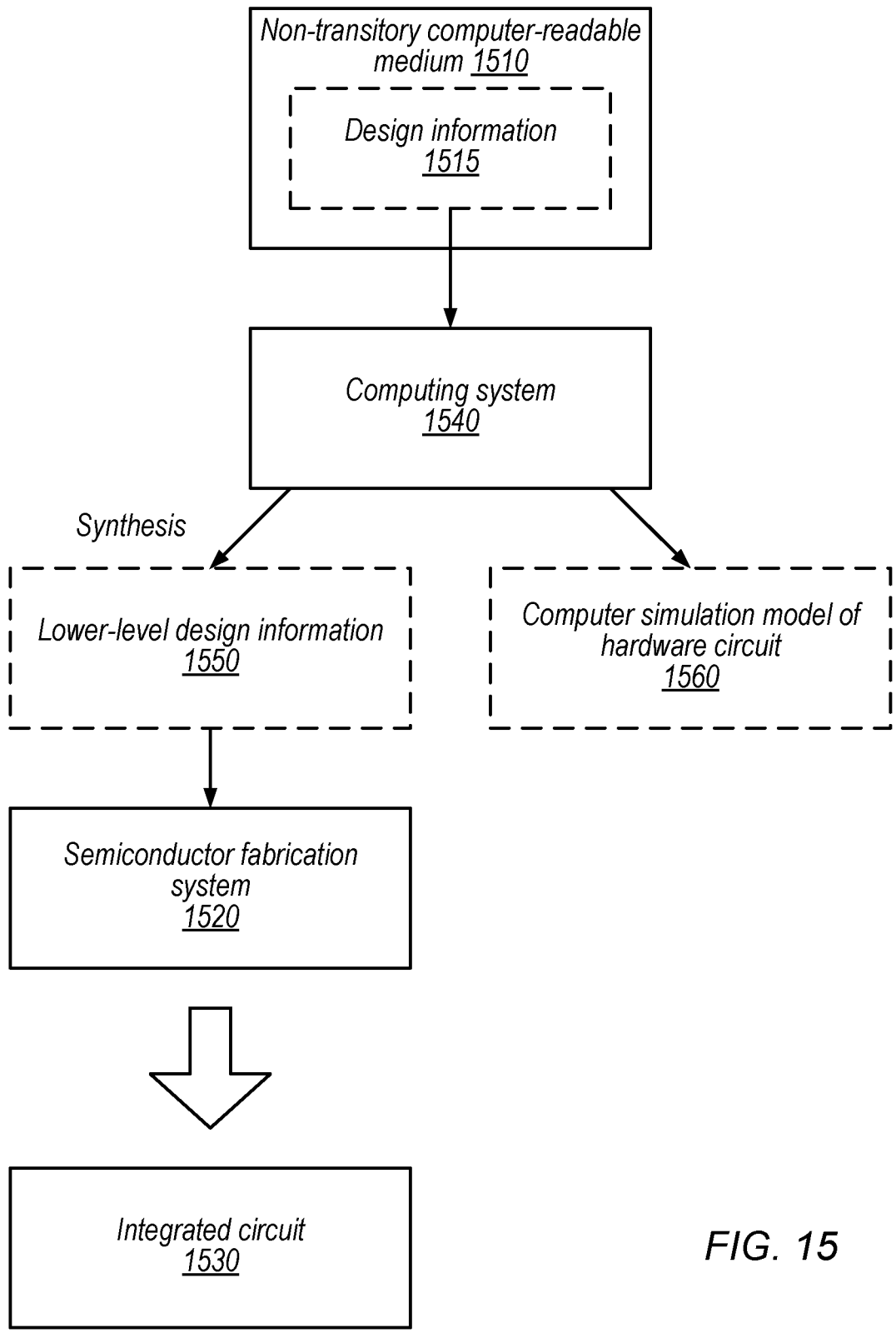
FIG. 15 is a block diagram illustrating an example computer-readable medium that stores circuit design information, according to some embodiments.

FIG. 15 is a block diagram illustrating an example non-transitory computer-readable storage medium that stores circuit design information, according to some embodiments. In the illustrated embodiment, computing system 1540 is configured to process the design information. This may include executing instructions included in the design information, interpreting instructions included in the design information, compiling, transforming, or otherwise updating the design information, etc. Therefore, the design information controls computing system 1540 (e.g., by programming computing system 1540) to perform various operations discussed below, in some embodiments.

In the illustrated example, computing system 1540 processes the design information to generate both a computer simulation model of a hardware circuit 1560 and lower-level design information 1550. In other embodiments, computing system 1540 may generate only one of these outputs, may generate other outputs based on the design information, or both. Regarding the computing simulation, computing system 1540 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 1540 also processes the design information to generate lower-level design information 1550 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 1550 (potentially among other inputs), semiconductor fabrication system 1520 is configured to fabricate an integrated circuit 1530 (which may correspond to functionality of the simulation model 1560). Note that computing system 1540 may generate different simulation models based on design information at various levels of description, including information 1550, 1515, and so on. The data representing design information 1550 and model 1560 may be stored on medium 1510 or on one or more other media.

In some embodiments, the lower-level design information 1550 controls (e.g., programs) the semiconductor fabrication system 1520 to fabricate the integrated circuit 1530. Thus, when processed by the fabrication system, the design information may program the fabrication system to fabricate a circuit that includes various circuitry disclosed herein.

Non-transitory computer-readable storage medium 1510, may comprise any of various appropriate types of memory devices or storage devices. Non-transitory computer-readable storage medium 1510 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1510 may include other types of non-transitory memory as well or combinations thereof. Accordingly, non-transitory computer-readable storage medium 1510 may include two or more memory media; such media may reside in different locations—for example, in different computer systems that are connected over a network.

Design information 1515 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 1540, semiconductor fabrication system 1520, or both. In some embodiments, design information may also include one or more cell libraries that specify the synthesis, layout, or both of integrated circuit 1530. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 1530 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 1520 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1520 may also be configured to perform various testing of fabricated circuits for correct operation.

In various embodiments, integrated circuit 1530 and model 1560 are configured to operate according to a circuit design specified by design information 1515, which may include performing any of the functionality described herein. For example, integrated circuit 1530 may include any of various elements shown in FIGS. 1B-3, 6, 9-11, and 13. Further, integrated circuit 1530 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. As one example, different designs may select or connect gates based on design tradeoffs (e.g., to focus on power consumption, performance, circuit area, etc.). Further, different manufacturers may have proprietary libraries, gate designs, physical gate implementations, etc. Different entities may also use different tools to process design information at various layers (e.g., from behavioral specifications to physical layout of gates).

Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 1520 to fabricate integrated circuit 1530.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:
graphics processor circuitry configured to operate on data in multiple memory address spaces;
data cache circuitry configured to cache data for the graphics processor circuitry, including data from the multiple memory address spaces at a first cache level, wherein the data cache circuitry includes:
tag circuitry configured to compare, from access requests to the first cache level of the data cache circuitry with tags of entries in the data cache circuitry, both:
a tag portion of a requested address, wherein the tag portion of a requested address is included in a first set of address bits for a first space of the multiple memory address spaces and is included in a second set of address bits for a second space of the multiple memory address spaces; and
memory address space information for the requested address, wherein the memory address space information identifies one of the multiple memory address spaces from which data is cached at the first cache level.

2. The apparatus of claim 1, wherein the multiple memory address spaces share tag storage circuitry and data storage circuitry of the data cache circuitry.

3. The apparatus of claim 1, wherein the tag circuitry is configured to perform tag checks for first and second requests in parallel, wherein the first and second requests use different sets of address bits of their respective requested addresses.

4. The apparatus of claim 1, wherein the memory address space information includes:
a memory type identifier that identifies a category of memory address space; and
a memory address space identifier that identifies an instance of the category of memory address space.

5. The apparatus of claim 1, further comprising invalidate control circuitry configured to invalidate all entries in the data cache circuitry for a given memory address space in a single cycle.

6. The apparatus of claim 1, further comprising flush control circuitry configured to identify all entries in the data cache circuitry for a given memory address space, in a single cycle, for subsequent flushing to a next cache level.

7. The apparatus of claim 1, wherein the data cache circuitry is configured to store and provide data at different granularities for different memory address spaces of the multiple memory address spaces.

8. The apparatus of claim 7, wherein the data cache circuitry is configured to perform cache operations based on tag state fields that include:
valid range information that indicates whether data associated a first address range is valid and whether data associated with a second address range is valid; and
dirty range information that indicates whether data associated a first address range is dirty and whether data associated with a second address range is dirty.

9. The apparatus of claim 8, wherein the valid range information has different formats for at least two different address spaces of the multiple memory address spaces.

10. The apparatus of claim 7, wherein:
the data cache circuitry includes multiple data bank circuits configured to store the cached data;
the tag circuitry includes multiple tag banks configured to compare tag information from requests with tag information for cache entries; and
the data cache circuitry includes multiple schedule circuits configured to determine a set of data banks to access for a given request based on comparison results generated by the tag banks, including to determine to access different numbers of data bank circuits for access requests of different granularities.

11. The apparatus of claim 10, wherein the schedule circuits are configured to determine the set of data banks for a given access request based on address-based bank and set hashing.

12. The apparatus of claim 10, wherein the schedule circuits are configured to:
maintain ordering of operations to a given cache line, wherein one or more cache lines are implemented using multiple data sub-banks; and
independently schedule multiple access operations to different data sub-banks for a given operation to a cache line.

13. The apparatus of claim 12, wherein the schedule circuits are further configured to:
buffer long-latency operations;
enforce scheduling policies between operations to different cache lines;
buffer store data, load data, fill data, and eviction data;
signal completion of access operations;
unroll a request from a tag bank into a multi-operation sequence; and
perform local atomic operations to a given byte range using one or more atomic functional units.

14. The apparatus of claim 12, wherein the schedule circuits include multiple hierarchical levels, including:
a first level configured to schedule operations at cache line granularity; and
a second level configured to schedule operations from the first level at sub-cache-line granularity.

15. The apparatus of claim 10, further comprising:
write buffer circuitry configured to buffer data to be written to the data bank circuits;
read buffer circuitry configured to buffer data read from the data bank circuits; and
transpose circuitry configured to transpose data for the write buffer circuitry and from the read buffer circuitry.

16. The apparatus of claim 15, wherein the transpose circuitry enables both parallel row accesses and parallel column accesses to data stored in the data cache circuitry for one of the multiple memory address spaces.

17. The apparatus of claim 1, further comprising:
occupancy management circuitry configured to determine occupancy parameters for the data cache circuitry and one of the multiple memory address spaces based on the memory address space information.

18. The apparatus of claim 1, wherein the apparatus is a computing device that further includes:
a central processing unit;
a display; and
network interface circuitry.

19. A method, comprising:
operating, by a graphics processor, on data in multiple memory address spaces;
caching, by a data cache of the graphics processor, data from the multiple memory address spaces;
comparing, by the data cache, from access requests to the data cache with tags of entries in the data cache, both:
a tag portion of a requested address, wherein the tag portion of a requested address is included in a first set of address bits for a first space of the multiple memory address spaces and is included in a second set of address bits for a second space of the multiple memory address spaces; and
memory address space information for the requested address, wherein the memory address space information identifies one of the multiple memory address spaces from which data is cached in the data cache.

20. A non-transitory computer-readable medium having instructions of a hardware description programming language stored thereon that, when processed by a computing system, program the computing system to generate a computer simulation model, wherein the model represents a hardware circuit that includes:
graphics processor circuitry configured to operate on data in multiple memory address spaces;
data cache circuitry configured to cache data for the graphics processor circuitry, including data from the multiple memory address spaces at a first cache level, wherein the data cache circuitry includes:
tag circuitry configured to compare, from access requests to the first cache level of the data cache circuitry with tags of entries in the data cache circuitry, both:
a tag portion of a requested address, wherein the tag portion of a requested address is included in a first set of address bits for a first space of the multiple memory address spaces and is included in a second set of address bits for a second space of the multiple memory address spaces; and
memory address space information for the requested address, wherein the memory address space information identifies one of the multiple memory address spaces from which data is cached at the first cache level.

* * * * *